United States Patent
Madge et al.

(10) Patent No.: US 10,422,420 B2
(45) Date of Patent: Sep. 24, 2019

(54) MOUNTING ARRANGEMENT FOR A PLANET GEAR

(71) Applicant: ROLLS-ROYCE plc, London (GB)

(72) Inventors: Jason J. Madge, Dursley (GB); Jonathan P. Bradley, Bristol (GB)

(73) Assignee: ROLLS-ROYCE PLC, London (GB)

( * ) Notice: Subject to any disclaimer, the term of this patent is extended or adjusted under 35 U.S.C. 154(b) by 88 days.

(21) Appl. No.: 15/680,613

(22) Filed: Aug. 18, 2017

(65) Prior Publication Data
US 2018/0058571 A1 Mar. 1, 2018

(30) Foreign Application Priority Data
Aug. 23, 2016 (GB) .................................. 1614366.1

(51) Int. Cl.
*F16H 57/08* (2006.01)
*F02C 7/36* (2006.01)
*F16H 1/28* (2006.01)

(52) U.S. Cl.
CPC .............. *F16H 57/082* (2013.01); *F02C 7/36* (2013.01); *F05D 2260/40311* (2013.01); *F16H 1/28* (2013.01)

(58) Field of Classification Search
None
See application file for complete search history.

(56) References Cited

U.S. PATENT DOCUMENTS

| | | | | |
|---|---|---|---|---|
| 2,382,846 A | * | 8/1945 | Barber | F16H 48/10 475/252 |
| 2,501,034 A | * | 3/1950 | Derbyshire | F16H 1/2836 475/346 |
| 3,943,787 A | * | 3/1976 | Hicks | F16H 1/2836 74/410 |
| 4,222,290 A | * | 9/1980 | Helmer | F16H 57/0427 475/159 |
| 4,762,024 A | * | 8/1988 | Graft | F16H 48/29 403/326 |
| 4,898,482 A | * | 2/1990 | Stewart | F16H 57/082 384/626 |

(Continued)

FOREIGN PATENT DOCUMENTS

| | | |
|---|---|---|
| CN | 203258045 U | 10/2013 |
| DE | 102013216795 A1 | 2/2015 |

(Continued)

OTHER PUBLICATIONS

Feb. 5, 2018 Search Report issued in European Patent Application No. 17 18 6802.

(Continued)

*Primary Examiner* — Justin Holmes
(74) *Attorney, Agent, or Firm* — Oliff PLC

(57) ABSTRACT

Described is a planet carrier rotatable about a carrier axis, comprising: a planet pin for receiving a planet gear, the planet pin having a body with an external surface for receiving a planet gear bearing or planet gear; a carrier having a first axial wall and a second axial wall with the planet pin extending there between along a planet pin axis, wherein each carrier wall includes a planet pin retention feature located on radially inwards of the planet pin axis and engaged with a portion of the planet pin.

16 Claims, 4 Drawing Sheets

(56) References Cited

U.S. PATENT DOCUMENTS

| | | | |
|---|---|---|---|
| 7,490,460 B2* | 2/2009 | Moniz | F02C 3/067 |
| | | | 415/9 |
| 2008/0194378 A1* | 8/2008 | Fox | F16H 1/2836 |
| | | | 475/347 |
| 2009/0105033 A1* | 4/2009 | Woo | F16H 57/082 |
| | | | 475/331 |
| 2010/0056321 A1 | 3/2010 | Snyder et al. | |
| 2012/0196720 A1 | 8/2012 | Miyawaki et al. | |
| 2015/0330498 A1 | 11/2015 | Carlino et al. | |

FOREIGN PATENT DOCUMENTS

| | | |
|---|---|---|
| EP | 0 274 874 A2 | 7/1988 |
| EP | 2532919 A2 | 12/2012 |
| WO | 2004/079230 A1 | 9/2004 |
| WO | 2015/106902 A1 | 7/2015 |

OTHER PUBLICATIONS

Feb. 10, 2017 Search Report issued in Great Britain Patent Application No. 1614366.1.

* cited by examiner

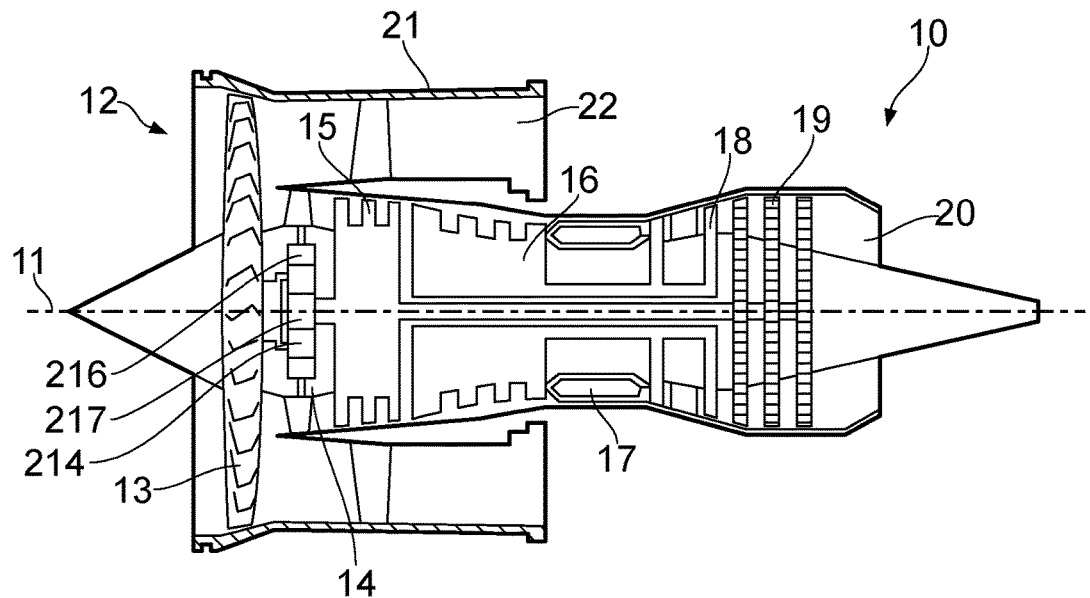
FIG. 1 Prior Art
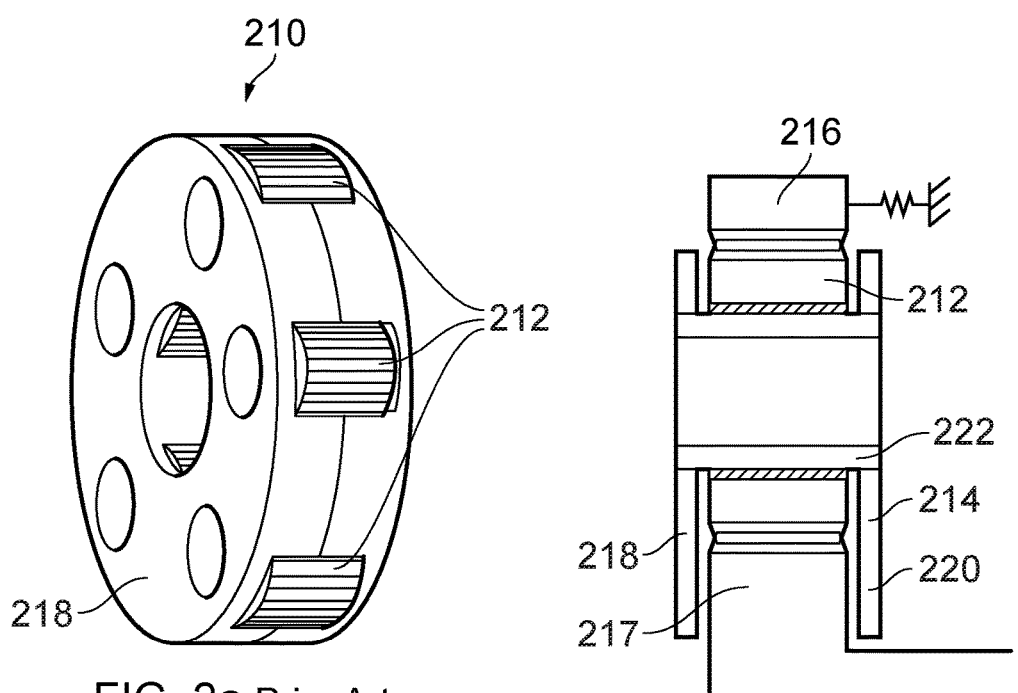
FIG. 2a Prior Art
FIG. 2b Prior Art

MOUNTING ARRANGEMENT FOR A PLANET GEAR

TECHNICAL FIELD

The present invention relates to a planet carrier for a planetary gear train. In some aspects, the invention may also relate to a planet pin for use with the carrier. The invention is particularly suited to gas turbine engine power gear box applications and wind turbines.

BACKGROUND

Current trends in gas turbine engines are moving towards so-called geared turbofan engines in which the fan is driven through a reduction gear train. The gear train allows the low pressure spool to be driven at higher rotational speeds which provides for a more efficient lighter engine core, whilst reducing the speed of the fan allows it to be a larger diameter thereby providing a higher bypass ratio. The reduction gear trains may be epicyclically configured where the fan is driven via the carrier of a planetary configuration, or a star configuration where the planet gears are fixed and the fan shaft is driven by the ring or star gear.

FIG. 1 shows a geared gas turbine engine 10 having a fan 12, low and high pressure spools, each having respective compressors and turbines driveably interconnected by respective shafts which are rotatable about a principal axis 11. Thus, there is a low pressure compressor 15 connected to the low pressure turbine 19 via a low pressure shaft, and a high pressure compressor 16 connected to a high pressure turbine 18 via a high pressure shaft. The low 15 and high 16 pressure compressors progressively compress air from an inlet downstream of a fan 12 to an outlet in flow proximity to the combustor 17. Compressed air flows from the high pressure compressor 16 to the combustor 17 in which fuel is added and the mixture burnt. The combusted gas then expands through and drives the high 18 and low 19 pressure turbines in flow series. The low and high pressure shafts interconnect the respective turbines and compressors provide the drive for the compressors.

The fan 12 is located at the front of the engine 10 to provide air for the inlet of the compressors and the main propulsive flow which is channeled down the bypass duct 22. The fan 12 is driveably connected to the low pressure shaft via a gear train 14 in the form of an epicyclic reduction gear box. The gear train 14 is located between the low pressure shaft and the fan 12 and is arranged to reduce the speed of the fan 12 relative to the speed of the low pressure turbine 19. Such an arrangement allows for a higher speed and more efficient low pressure turbine 19 together with and slow spinning larger fan which can provide a higher bypass ratio. This combination allows the speed of the fan and low pressure turbine to be independently optimised.

The fan 12 has a plurality fan blades 13 extending radially from a hub which is mounted so as to rotate about the principal axis of the engine 10. The fan 12 resides within a fan casing 21 which partially defines the bypass duct 22. An engine casing surrounds the engine core which comprises the low and high pressure spools and combustor 17. The engine casing generally provides containment and structural support for the engine core. The engine casing is ultimately attached to and supported by the wing of the aircraft via an appropriate arrangement of struts which extend across the bypass duct and the nacelle which attaches to a pylon as is well known in the art.

The gear train 14 is in the form of an epicyclic reduction gearbox which is driven in a planetary configuration. The gear train 14 includes a ring or annular gear which is held substantially stationary in relation to the engine casing, a planet gear set with individual planets gears interconnected via a carrier, and a sun gear. The sun gear is rotatably connected to the low pressure shaft. The fan 12 is connected to the output shaft of the gearbox which is in the form of the carrier of the planet gear via a fan shafting arrangement.

Generally, planetary gearboxes are used in power transmission systems across many industries including, for example: automotive, wind turbines, aerospace and marine. In its simplest form, it comprises a central gear or sun gear surrounded by multiple planet gears mounted on a single carrier, which in turn sits within a single ring gear which has internal gear teeth for engagement with the planet. The sun gear, carrier and ring gear are concentrically with the engine principal axis 11.

In operation, one of the sun gear, planet carrier and ring gear are held stationary with the other two providing an input and an output to the gearbox. This flexibility in selection of the various components as a stator or as an input or output rotors determines the gear ratio of the gearbox and allows for several drive variations, as are known in the art.

In epicyclic gearboxes which experience high loading, it is typical that the carrier forms a stiff structure around the gears to ensure efficient transfer of torque and reduce unnecessary gear wear. The axially opposed end walls of the carrier include apertures into which a so-called planet pin is inserted. The planet pin defines the central rotational axis of the respective planet gear and carries or includes the planet gear wheel bearing. During assembly the pins are fed into the apertures to locate the planet gears in the correct position in relation to the carrier. The pins are retained in the apertures, typically by a combination of interference fit and mechanical fasteners, such as bolts.

Under centrifugal loading the planet gear is forced radially outwards as the carrier spins. It is restrained by the planet pin via the planet bearing which becomes loaded on the radially inner surface, the radial inner surface being closest to the central axis of the carrier. The planet pin is restrained from moving by its fit within the carrier pin aperture in the axial wall which results in the radially outer portion of the carrier aperture carrying the load. However, it is desirable to provide the outer rim of the carrier with a reasonable shallow and consequently thin radial profile to reduce the centrifugal loading on the carrier and ring gear. The thin radial profile can result in a deflection under the centrifugally loaded planet pin which can result in significant deflection of the carrier plate and its rim. Further, the planet pin can be deformed by the centrifugal loading induced by the planet gear. The combined effect of these load induced deformations can be to move the planet gear radially outwards by an appreciable amount. Such a movement can affect gear meshing and deleterious levels of wear.

The present invention seeks to provide an improved planet pin and carrier for a planet gear.

SUMMARY

The present invention provides a planet carrier according to the appended claims.

Described below is a planet carrier which is rotatable about a carrier axis. The planet carrier may comprise: a planet pin for receiving a planet gear, the planet pin having a body with an external surface for receiving a planet gear bearing or planet gear. A carrier may have a first axial wall and a second axial wall with the planet pin extending therebetween along a planet pin axis. Each carrier wall may include a planet pin retention feature located on radially inwards of the planet pin axis with respect to the carrier axis and engaged with a portion of the planet pin.

Providing a planet pin retention feature radially inwards of the planet pin axis and engaged with a portion of the planet pin allows the centrifugal load exerted on the planet pin in use to be distributed to the carrier in an area less prone to distortion.

The pin retention feature provides radial retention of the planet pin. The pin retention feature provides a location feature against which the centrifugal forces exerted on the planet pin in use can react.

The planet pin retention feature may be a projection which extends from an inner surface of either or both of the first or second axial carrier wall and towards the body of the planet pin and includes an engagement surface which faces radially outwards from the planet pin axis.

The engagement surface may be radially inwards of the planet pin axis with respect to the carrier axis.

The projection may be an arcuate or annular rib. The projection may extend through at least 180 degrees and may have centre of curvature which is concentric with the planet pin axis.

The planet pin may include an end surface with one or more walls or flanges which define a projection receiving hollow extending into the planet pin.

The planet pin may be an elongate body. The body may be cylindrical. The body may include an inner and an outer wall extending longitudinally between a first and a second end face. The wall or flange may extend from either of the first or second end face of the pin. Each end face may include a wall or flange. The wall or flange may extend partially or fully around the periphery of the pin. The wall or flange may define an inner surface which abuts the engagement surface of corresponding outer surface of the carrier projection.

The projection receiving hollow may define a circumferential pin rim on the end face of the pin.

The pin rim may be on a periphery of the planet pin.

The pin rim may extend only partially around the periphery of the pin, the terminal ends of the rim providing an opening for receiving the projection. The pin rim may be provided in the form of a U-shaped rim when viewed end on. The pin rim may extend around the rim for less than 180 degrees.

The planet pin may be rotatably engaged with the projection. Either or both of the carrier and pin may include a locking mechanism which prevents rotation of the planet pin about the pin axis, once the pin is engaged.

The carrier may comprise an assembly of a first part including the first axial wall, and a second part including the second axial wall.

The carrier may also comprise a planet pin axial clamp which extends through the planet in and is arranged to prevent the separation of the first and second axial walls.

Also described is a planetary gear train including the planet carrier, and a gas turbine engine including the planetary gear train.

Within the scope of this application it is expressly envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

In the description below, unless otherwise stated, the geometric references for axial and circumferential should be taken with reference to the principal axis of the gas turbine engine. The terms upstream and downstream should be taken with reference to the flow stream of the main gas path through the engine. Inward and outward facing surfaces should be taken with reference to the rotor surfaces.

DESCRIPTION OF DRAWINGS

Embodiments of the invention will now be described with the aid of the following drawings of which:

FIG. 1 shows a schematic longitudinal section of a geared turbofan gas turbine engine.

FIGS. 2a and 2b show a perspective view and a longitudinal partial schematic section of a known planet carrier and planetary gear box respectively.

DETAILED DESCRIPTION OF INVENTION

Figure 3:
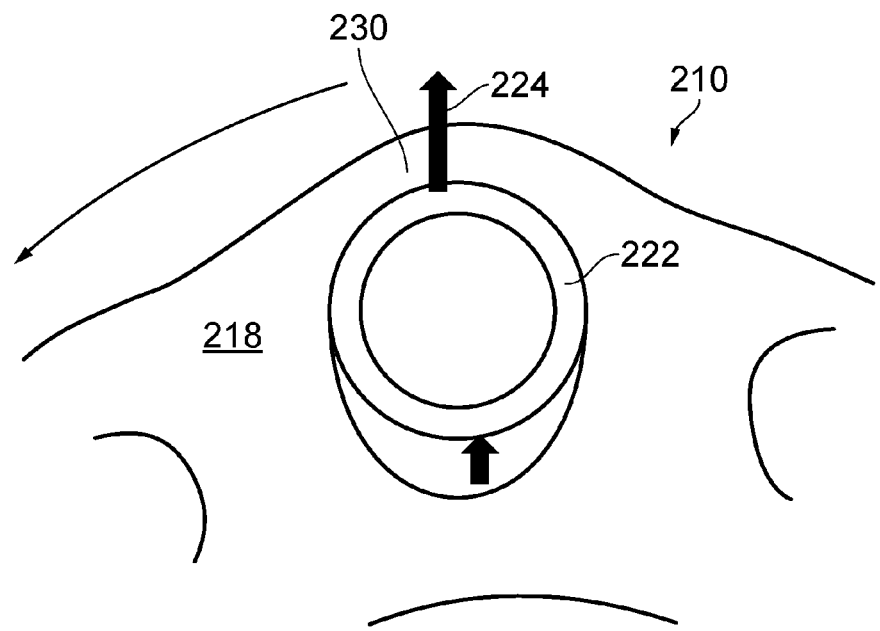
FIG. 3 shows an axial end view of a known carrier which is subjected to rotation and centrifugal loading.

FIGS. 2a and 2b shows a typical carrier 210 from a planetary gearbox 14. The planet carrier 210 comprises a plurality of planet gears 212 which are equidistantly distributed at a constant radius around the circumference of the carrier 210. In the example shown, there are five planets gears. The planet gears 212 are exposed through the radially outer wall of the planet carrier 210 so that they can be driveably received within a ring gear 216. The planet carrier 210 has a central bore in which a sun gear 217 received. The planet gears 212 are exposed on the radially inner wall of the central core so as to be driveably engageable with the sun gear 217.

The carrier 212 may be made up from two parts. Each of the two parts includes an axial end wall 218, 220. The two parts of the carrier 210 are placed in an abutting relation and attached together around a circumferential split line to provide a single rigid structural housing for the planet gears 212. It will be appreciated that the construction of the carrier may vary from this basic structure which is provided as an example only.

The planet gears 212 are rotatably mounted within the carrier 210 by so-called planet pins 222 which extend between the two axial end walls 218, 220. The planet pins 222 in the example shown in FIG. 2b, pass through apertures in the axial end walls 218, 220 and are retained therein by the combination of interference fit and some other locking mechanism (not shown). Such a locking mechanism may include bolts, for example.

FIG. 3 shows a prior art arrangement of the carrier 210 from an axial end view. The carrier 210 is shown in a rotating state in which the planet pin 222 is centrifugally loaded as indicated by the thick arrow 224. The centrifugal loading placed on the pin 222 is a resultant combination of centrifugal forces acting on the pin 222, the bearing, and the planet gear 212. This can cause a significant deformation in the radially outer rim 230 of the carrier and can also cause transverse elongation of the planet pin 222 which is effectively squashed between the planet gear and carrier rim 230 under the centrifugal loading. The centrifugal loading also causes increased strain in the portions which surround the planet pin aperture in the carrier axial wall 218, 220.

This problem is particularly relevant to large gearboxes such as those found in the aero industry applications and wind turbines, for example. In such heavy duty machines, it is difficult to avoid the movement of the planet pin 222 under centrifugal loading unless substantial features are included to restrict the permissible radial movement. Such features may include a preloaded interference fits, high clamping loads on the planet pins 222 with the use of threaded fasteners, or an increase in size of the carrier. Another option may be to permanently join the planet pin 222 to the carrier end wall 218, 220, for example by welding, however this is an inferior solution from a maintenance perspective as the gearbox cannot be easily disassembled.

Figure 4:
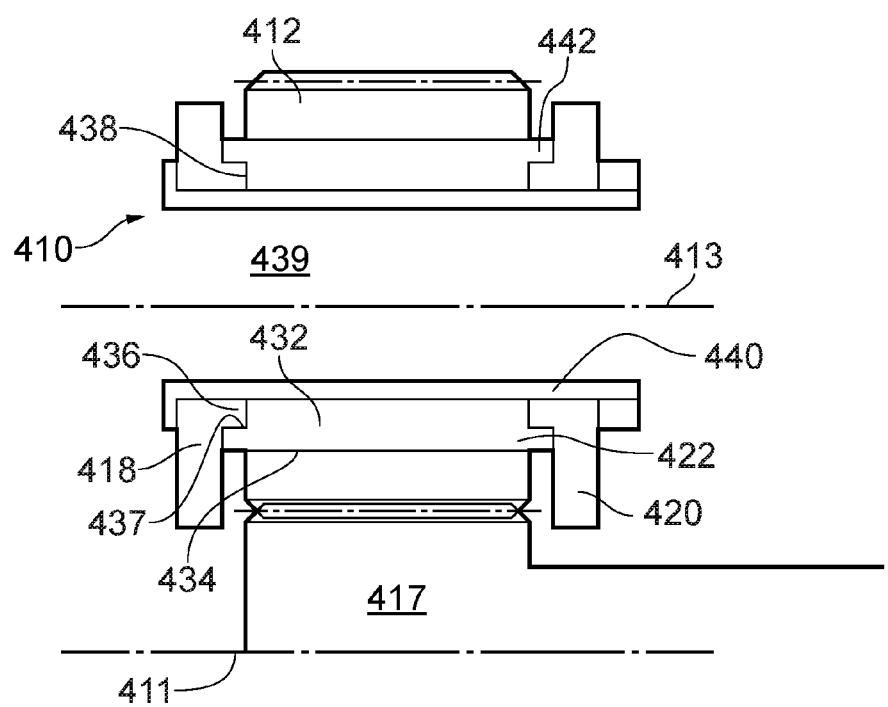
FIG. 4 shows a partial longitudinal section of a planet carrier.

FIG. 4 shows a partial section of a gear box having sun gear 417, received within a circular array of planet gears 412 individually rotatable about a planet gear axis 413 and held in a fixed relation to one another in a planet carrier 410 which in turn is inside a ring gear. The sun gear 417 and planet carrier 410 are rotatable about a carrier axis 411 and includes a planet pin 422 for receiving the planet gear 412. The carrier 410 has axially opposing end walls 418, 420. The pin 422 has a body 432 with an external surface 434 for receiving the planet gear bearing or planet gear, as the case may be. The planet pin 422 may be considered to include all or part of the planet bearing for the purpose of the description but they may be separate in a working embodiment. The planet pin 422 will typically be a cylindrical body which is elongate, having a longitudinal axis which defines the axis of rotation of the planet gear 412. The carrier 410 has a first axial wall 418 and a second axial wall 420 with the planet pin 422 extending therebetween a long a planet pin axis 413.

Each carrier wall 418, 420 includes a planet pin retention feature 436 located on the radially inner surface of the carrier wall 418, 420 and within a radially outer or external surface 434 of the planet pin 422. In this example, the planet gear retention feature 436 is a projection which extends from an inner surface (in relation to the carrier) of the respective axial carrier wall 418, 420 and into the body or a wall of the planet pin 414.

The planet pin retention feature 436 engages with the pin 422 to provide radial retention of the planet pin 422. The engagement is provided on at least one radially inner portion of the planet pin 422 with respect to the carrier axis 411 or principal axis of the gear box. Thus, the centrifugal loading on the planet pin 422 is carried by the portion of carrier wall 218, 220 which is radially inwards of or local to the radially inner portion of the planet pin aperture.

The projection 436 may take any suitable form such as a single or plurality of pins or stumps, or, as per the example of FIG. 4, may include a rib 436. The rib 436 may be elongate so as to extend around the periphery of the pin aperture and have axial and radial depth in the longitudinal section of the planet carrier 410 and with respect to the longitudinal central axis. The rib 436 may be curved or arcuate. In the case of an arcuate rib 436, the rib 436 may be centred on the central axis 413 of the pin. The rib 436 can fully extend around the periphery of an axial wall aperture so as to be a continuous or fully annular feature.

The carrier projection 436 provides an engagement surface for engagement with the corresponding feature of the pin 422 and providing radial restraint thereof. Thus, as can be seen in FIG. 4, there is provided an engagement surface 437 facing radially inwards towards the carrier axis 411 which abuts a radially opposing surface of the gear pin 422. The engagement surface 437 faces radially outwards from the planet pin axis 413, and includes at least one part which is radially inwards of the planet pin axis with respect to the carrier axis 411.

The rib 436 may extend orthogonally from the inner surface of the carrier axial wall 418, 420 and is thus parallel to the pin axis 413 in section. The axial and radial extent of the projection 436 will be determined in accordance with the mechanical requirements which, in part, will be determined by the centrifugal loading it will experience in service.

There may be a projection on both of the carrier walls to provide opposing projections which extend from respective fixed ends towards respective opposing free ends. The projections may be provided at a common radius from the planet pin axis 413.

To accommodate the projection 436, the pin 422 may include a corresponding feature to mateably receive the carrier projection 436. Hence, the pin may include a flange 442 or a hollow 438, 439 on or in the end face thereof. The hollow may take any suitable form such as a central bore 439 of the pin 422, a rebate or recess 438 provided in an external surface of the pin 422. Thus, there may be a portion of the pin wall or an extension thereof which resides radially outside of the carrier projection 436. The pin projection 442 may be provided in the form of one or more flanges which extend axially (with respect to the longitudinal axis of the pin) from the end of the pin 422.

Although the carrier projection 436 may extend around the radially outer portion of the planet pin aperture, it will be appreciated that the centrifugal load is predominantly carried by the radially inner portion of the projection. Hence, it may be possible to have a projection which extends only partially around the planet pin. For example, the rib may extend through an arc of less than 180 degrees. Further, the rib may be made from discrete sections of short or stumps ribs where the mechanical constraints allow.

The carrier 413 shown in FIG. 4 is a two part carrier similar to that shown in FIG. 2a. Hence, although not shown, the first and second axial end walls of the carrier are provided by first and second components which are clamped together at an abutting split line.

To help prevent any axial separation of the axial end walls 418, 420 under centrifugal loading, an axial restraint or tether 440 may be included local to the planet pin 422. In the present example, the tether 440 is a two part mechanical clamp which extends between and axially clamps the outer surfaces of the axial end walls 418, 420 to prevent their separation in use. Hence, as shown in FIG. 4, there is a mechanical clamp 440 which passes through the central bore 439 of the planet pin 422 and is threadingly engaged to a corresponding nut which is located on the outer surface of the second axial end wall 420.

The mechanical clamp 440 is in the form of a threaded tube which generally comprises a tubular body having a central bore therethrough. The first end of the threaded tube includes a flanged head which abuts the outer surface of the axial wall of the carrier when in situ. The second end 444 of the tubular body includes a thread which is received in the corresponding nut 446. The nut may be a separate element or may be fixedly attached to the outer surface of the second axial wall 420 of the carrier 413. The tube is mounted within the planet pin 414 and is concentric with the planet pin axis 413. It will be appreciated that suitable formations on the head and nut may be provided for engagement with a torquing tool for example.

Once the planet gear arrangement 410 has been assembled, the threaded tube 440 is inserted into the planet pin central bore and torqued to a required level.

A clearance may be provided between the axial restraint and the planet pin to prevent the centrifugal force being transferred from the radially inner portion of the planet pin 422 to the radially outer and the corresponding portion of the carrier wall. The transfer of force in this way may undermine some of the benefit of the pin retention feature.

It will be appreciated that the mechanical clamp may be provided in other ways. Further, the mechanical clamp may not be needed if the carrier is of a single piece construction or there are other structural elements local to the planet pin or planet gear which provide a tether to prevent the axial walls drifting apart in service.

The planet pin 422 may be of a generally tubular construction having a pin wall and a central throughbore. The pin wall includes an inner surface, an outer surface and a first and second end faces.

Each of the end faces may include a hollow portion 438 in which the projection can be received. The hollow portion 438 in the example shown in FIG. 4 is in the form of a rebate in the end face and inner surface. The rebate 438 provides the end face with a hollow defined by a circumferential rim 442 which extends around the radially outer peripheral rim of the end face. In other examples, the hollow may be provided by a channel or hole which extends into the pin body or wall from the end face. Alternatively, the hollow may be provided by the central bore 439 of the pin 422. It will be appreciated that the rim shown in FIG. 4 may not fully extend around the pin. In other examples, the hollow may be defined or replaced by a flange or other form of projection which receives and abuts the carrier projection 436. The flange may be a rib as defined by the hollow which may extend fully or partially around an end face of the pin.

Figure 5:
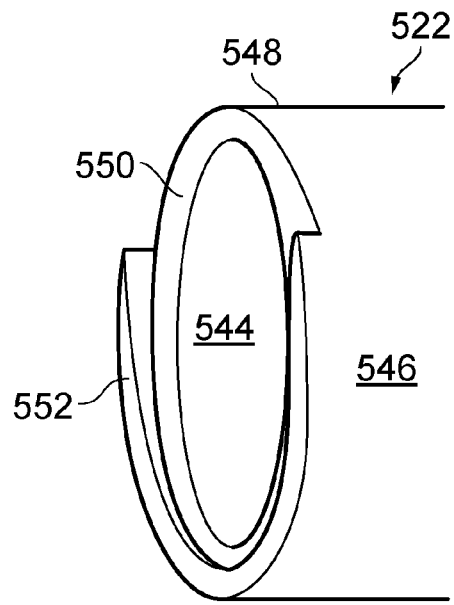
FIG. 5 shows a perspective view of an end portion of a planet pin.
Figure 6:
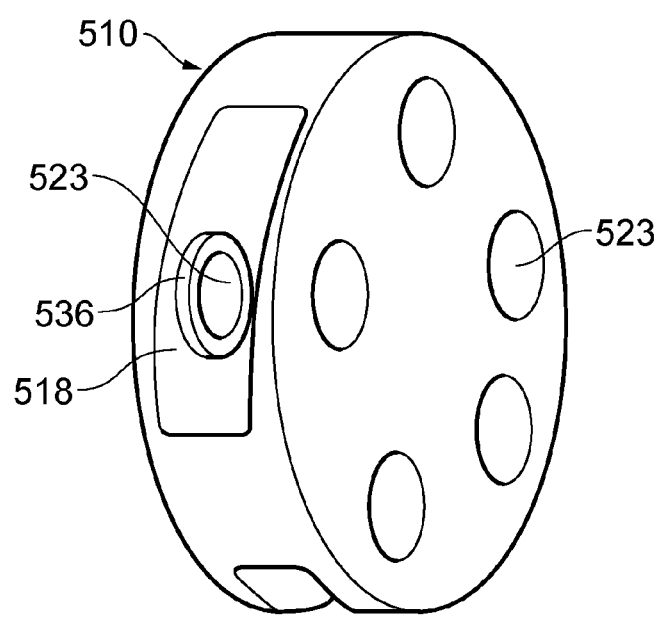
FIG. 6 shows a perspective view of a carrier.
Figure 7:
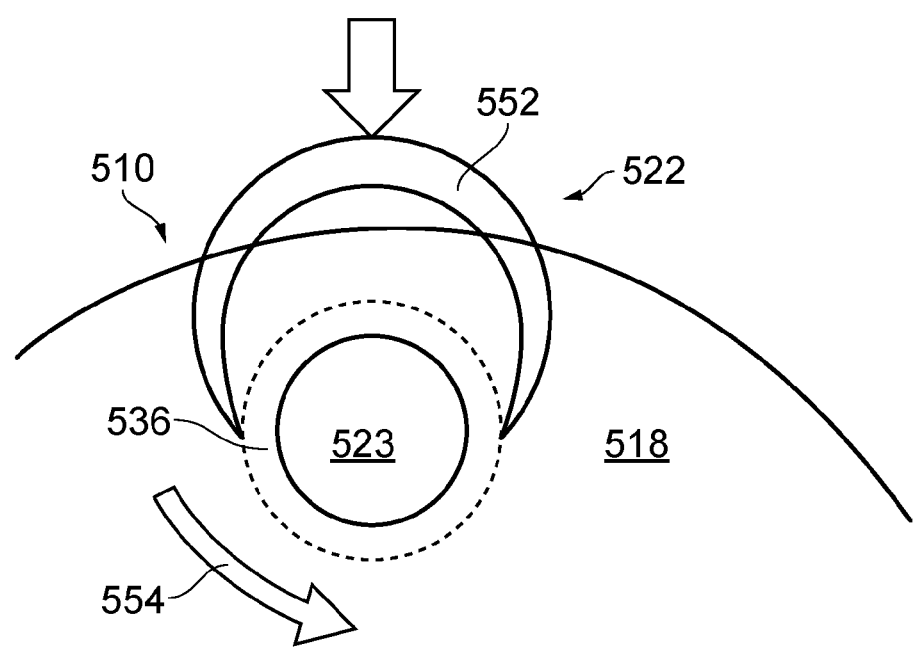
FIG. 7 shows the assembly of the pin shown in FIG. 5 with the carrier of FIG. 6.

FIGS. 5, 6 and 7 show a further example of a planet pin 522 and carrier 510 arrangement in which the pins 522 are received in the pin apertures 523. Thus, in FIG. 5, there is shown planet pin 522 having a hollow tubular body with inner 544 and outer 546 surfaces defined by a tube wall 548, and an end face 550 having circumferential rim 552 extending only partially around the circumference end face. The rim 552 extends through an arc greater than 180 degrees on the outer surface of the wall but is generally semi-circular to provide a cup or u-shaped rim when viewed end on. The radial thickness of the wall is substantially constant along its length. However, the terminal ends of the rim taper in from the inner surface of the wall to provide the radially inner surface of the rim 552 with a substantially u-shaped hollow into which a projection can be slidingly received.

FIG. 6 shows a carrier 510 having an annular projection 536 extending in from the inner surface of the axial wall 518 towards the centre of the carrier 510. The projection 536 is in the form of a rib having radial depth and axial length and is similar to the one described in connection with FIG. 4.

FIG. 7 shows the assembly of the pin 522 shown in FIG. 5, with the carrier 510 shown in FIG. 6. The pin 522 is presented to the carrier projection 536 from a radially outwards direction and slid between the axial end walls 518 of the carrier 510. The rib 552 of the pin includes a u-shape, the open end of which is faced radially inwards so that the projection can be received therein. Once the projection is fully received by the pin hollow defined by the rib 552, the pin may be rotated through 180 degrees 554 so that the hollow opening faces radially outwards, and the radially inner half of the rim projection is seated snugly within the rebate provided by the circumferential rim.

Once the pin is rotated and in place, a locking mechanism such as a bolt or key can be inserted to prevent any in service rotation of the planet pin.

It will be understood that the invention is not limited to the embodiments described above and various modifications and improvements can be made without departing from the concepts described. Except where mutually exclusive, any of the features may be employed separately or in combination with any other features and the disclosure extends to and includes all combinations and sub-combinations of one or more features described herein.

The invention claimed is:

1. A planet carrier rotatable about a carrier axis, comprising:
   a planet pin for receiving a planet gear, the planet pin having a body with an external surface for receiving a planet gear bearing or planet gear;
   a carrier having a first axial wall and a second axial wall with the planet pin extending therebetween along a planet pin axis,
   wherein each carrier wall includes a planet pin retention feature located radially inwards of the planet pin axis with respect to the carrier axis and engaged with a portion of the planet pin, and
   wherein the planet pin retention feature is a projection which extends from an inner surface of either or both of the first or second axial carrier wall and towards the body of the planet pin and includes an engagement surface which faces radially outwards from the planet pin axis.

2. A planet carrier as claimed in claim 1, wherein the engagement surface is radially inwards of the planet pin axis with respect to the carrier axis.

3. A planet carrier as claimed in claim 1, wherein the projection is an arcuate or annular rib.

4. A planet carrier as claimed in claim 3, wherein the projection extends through at least 180 degrees and has centre of curvature which is concentric with the planet pin axis.

5. A planet carrier as claimed in claim 1, in which the planet pin includes an end surface with one or more walls or flanges which define a projection receiving hollow extending into the planet pin.

6. A planet carrier as claimed in claim 5, wherein the projection receiving hollow defines a circumferential pin rim on the end face of the planet pin.

7. A planet carrier as claimed in claim 6, wherein the pin rim is on a periphery of the planet pin.

8. A planet carrier as claimed in claim 6, wherein the pin rim extends only partially around the periphery of the pin, the terminal ends of the pin rim providing an opening for receiving the projection.

9. A planet carrier as claimed in claim 8, wherein the pin rim is U-shaped.

10. A planet carrier as claimed in claim 8, wherein the planet pin is rotatably engaged with the projection.

11. A planet carrier as claimed in claim 10, wherein either or both of the carrier and planet pin include a locking mechanism which prevents rotation of the planet pin about the pin axis, once the planet pin is engaged with the planet pin retention feature.

12. A planet carrier as claimed in claim 1, wherein the carrier comprises an assembly of a first part including the first axial wall, and a second part including the second axial wall.

13. A planet carrier as claimed in claim 1, further comprising a planet pin axial clamp which extends through the planet pin and is arranged to prevent the separation of the first and second axial walls.

14. A planetary gear train including the planet carrier of claim 1.

15. A gas turbine engine including the planetary gear train of claim 14.

16. A planet carrier rotatable about a carrier axis, comprising:
- a planet pin for receiving a planet gear, the planet pin having a body with an external surface for receiving a planet gear bearing or planet gear;
- a carrier having a first axial wall and a second axial wall having an aperture therein for receiving the planet pin which extends between the first axial wall and second axial wall along a planet pin axis,
- wherein each carrier wall includes a projection extending around a radially inward periphery of the aperture with respect to the carrier axis, wherein the projection mates with a portion of the planet pin so as to restrict the radially outwards movement of the planet pin, and
- wherein an engagement surface of the projection faces radially outwards from the planet pin axis.

* * * * *